June 4, 1963  C. F. STROMEYER  3,092,471
PROCESS FOR CONDITIONING CARBONACEOUS MATERIAL
Filed Nov. 20, 1959
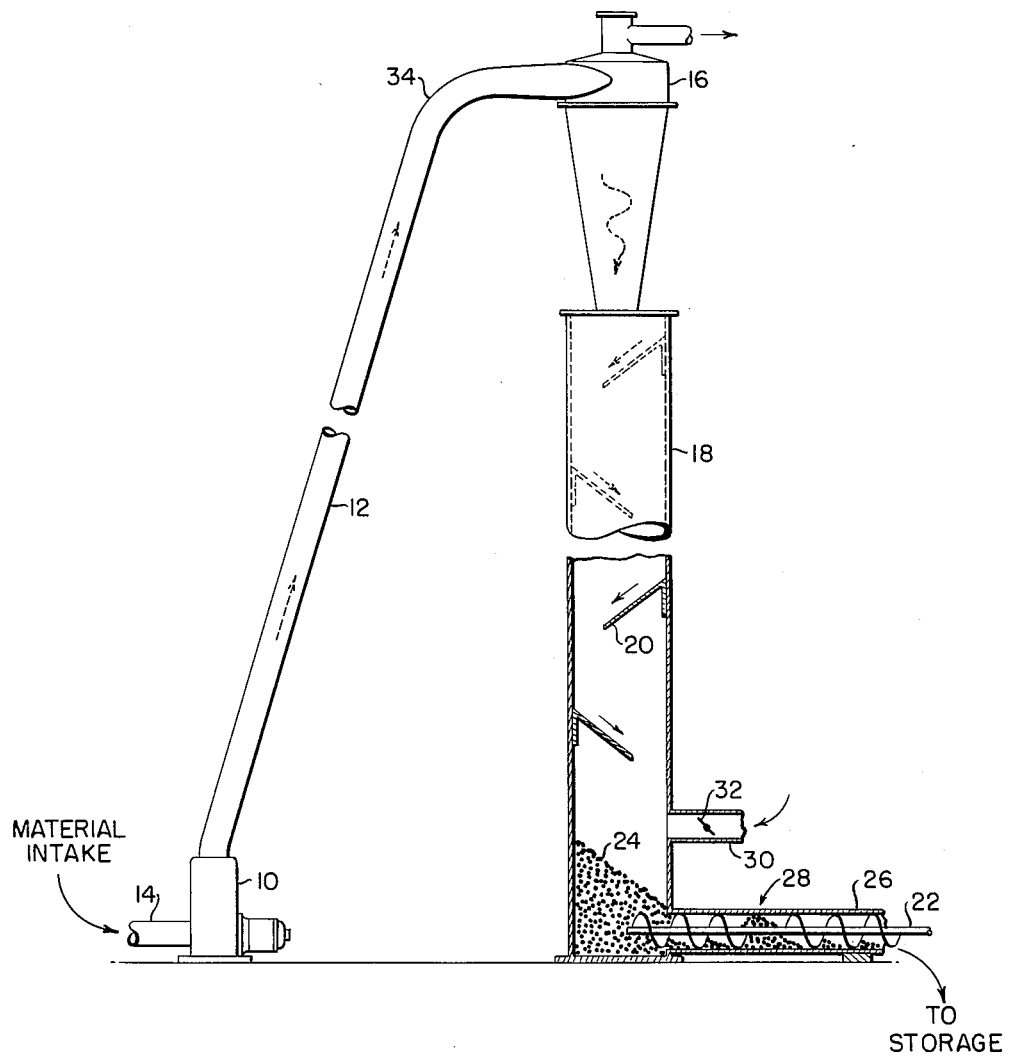

United States Patent Office 3,092,471
Patented June 4, 1963

3,092,471
PROCESS FOR CONDITIONING CARBONACEOUS MATERIAL
Charles F. Stromeyer, Marblehead, Mass., assignor of one-third to George F. Ropes, Hamilton, Mass.
Filed Nov. 20, 1959, Ser. No. 854,387
1 Claim. (Cl. 34—10)

This invention relates to the production of carbonaceous material and more particularly comprises a novel process for quickly reducing the temperature of fresh carbonaceous material to a point where the material becomes stable. This invention also includes a novel apparatus for carrying out this process.

In the process of making charcoal and certain other carbonaceous material, a cooling period in an oxygen restricted atmosphere is used to lower the temperature of the material. But the material may not yet be stable and, if stored in bulk, may rise in temperature to a point of self ignition. The danger of this spontaneous combustion is particularly great when making fine granular retort charcoal.

Long airing periods are customarily used to condition or normalize the charcoal prior to shipping or bulk storaging. During the airing period the charcoal must be protected from the weather and it is periodically raked to dissipate the heat that may be generating within the pile. The Interstate Commerce Commission of the United States considers granular retort charcoal to be hazardous and regulates the manner in which it may be shipped. The present regulations require, among other things, that granular retort charcoal be stored and ventilated for not less than 20 days prior to shipment. Even though there is compliance with the regulation, there is no certainty that the product is safe for shipping since shipments have on occasion caught fire, presumably from spontaneous combustion.

In a plant where charcoal is being mass produced on a continuous basis of, say, 30 tons per day, the facility for airing and storing the product for a minimum of 20 days must have a capacity of at least 600 tons. This facility must have a tremendous surface area since it is impractical to pile the charcoal to a considerable depth and still be able periodically to rake the bulk for thorough airing. This facility is huge and costly and, aside from this, there is always the imminent danger of a fire.

A primary object of my invention is to provide a simple, rapid method for conditioning freshly produced charcoal or other carbonaceous material so as to render the product safe for handling or for bulk storaging.

Another object of my invention is to provide relatively inexpensive apparatus for subjecting the charcoal or other carbonaceous material to the conditioning process.

A further object of my invention is to make the process fool proof by the elimination of variables inherent where the human element is present.

These and other objects and features of my invention will appear more readily from a detailed description of my invention with reference being made to the accompanying drawing which is a view in side elevation partly in section of an apparatus made in accordance with the invention.

Whether the liberation of heat energy is the result of mechanical friction created when air is absorbed by freshly produced charcoal or is the result of a chemical change producing an exothermic reaction makes little difference. The energy must be freely dissipated so there is no significant rise in the temperature of the charcoal. Apparently, the reaction time is extremely rapid if each grain of charcoal is free to absorb air by the exposure of all of its surface areas simultaneously. The reaction time is probably somewhat slower in the case of a small lump of charcoal because of its greater thickness. Nevertheless, it is still rapid.

Basically, my invention involves the automatic exposure of each grain or lump of charcoal to cool air for a finite period of time and while being exposed, to permit the free dissipation of heat that is generated within the grain or lump of charcoal. Hereinafter, I shall refer to the grains or lumps of charcoal as "particles," and to the charcoal consisting thereof as "particulate" charcoal.

Referring now to the drawing there is illustrated an apparatus which may be used in the practice of the invention. A motor driven centrifugal blower 10 provides a high velocity air flow for an inclined pneumatic conveyor 12. The air suction draws the particulate charcoal into an intake 14 and the moving air transports the charcoal to a cyclone separator 16 whereupon the charcoal falls out of the air stream down through a vertically mounted receiving tank or tower 18. The tower may be provided with a series of alternately arranged baffle plates 20 to slow the descent of the charcoal as it falls through the tower. By this arrangement, the charcoal slides off the highest baffle, falls through a short space onto the next baffle, again through a short space to the third baffle and successively down through the length of the tower. A screw conveyer 22 (motor driving source not shown) transports the charcoal from the base of the tower to storage or to other operations.

The tower is not permitted to fill up with charcoal as this would tend to defeat the conditioning process. To avoid this automatically the capacity of the screw conveyor 22 is made greater than the capacity of the pneumatic conveyor 12 or, the production rate is arranged so that the amount of charcoal fed to the intake 14 is at a rate slower than the capacity of the screw conveyor 22. For further avoiding misuse of the apparatus, the motor circuit of the centrifugal blower 10 is electrically interlocked with the circuit of the motor driving the conveyor 22. This prevents the pneumatic conveyor 12 from operating without the screw conveyor 22 turning.

If air were allowed to flow freely through the conveyor 22 into the tower, excessive up-drafts may be created which would disturb the efficiency of the cyclone separator 16. To avoid this, a certain amount of the conditioned charcoal 24 is permitted to collect at the base of the tower and thereby form an airlock. This is accomplished by restricting the extent of the penetration of the screw conveyor 22 into the tower 1. An additional airlock may be provided in a tubular enclosure 26 surrounding the conveyor 22 by simply omitting a short section of the conveyor's flighting in the region 28. The traveling charcoal will thus automatically form an airlock about the region 28.

Cyclone separators usually function with low velocity air traveling up through the separator. To provide this air flow, an air inlet 30 is arranged someplace in the wall of the tower 18. The air inlet 30 can be simply an air duct with an adjustable damper 32.

Fast moving charcoal is abrasive and to lessen the wear on the pneumatic conveyor 12 in the vicinity of the bend 34, the duct may be enamel-lined or constructed with some other material which will resist abrasion better than steel tubing.

In the apparatus shown conditioning takes place very rapidly. For example, the traveling time through the pneumatic conveyor is extremely fast when the air velocity is approximately 4000 feet per minute. If the total length of the conveyor is 50 feet, the total time a given particle of charcoal is in the conveyor is only ¾ of a second. Experiments show that a great amount of the desired conditioning has already occurred by the time the charcoal has left the pneumatic conveyor. This is the result of exposing each particle of charcoal to free moving air. The charcoal particle cannot reach the end of the pneumatic conveyor unless it was airborne. The generated heat energy is carried away by the freely moving air. The additional exposure time to free air provided by the relatively slow drop of the charcoal down through the tower completes the conditioning. In one installation, freshly produced granular charcoal entered the intake of the pneumatic conveyor at a temperature of 150° F. Travel time through the conditioning process was less than 2 seconds. The charcoal emerged at a temperature of 74° F. which was approximately the ambient air temperature. Irrespective of how this charcoal was then stored, it generated no heat. This is the practical criterion in determining whether the charcoal is safe for handling. In contrast, charcoal from the same retort, emerging at the same temperature of 150° F., but not processed through the conditioning apparatus, was stored in piles. The inner temperature of small piles slowly rose and within one hour reached a temperature whereby self-ignition occurred when the inner section of the pile was suddenly exposed to the surrounding air. The same thing occurred with larger piles but it took a longer time for the temperature to reach such a dangerous level.

In a modern plant producing 30 tons of charcoal per 24-hour day using a continuous production process, the conditioning apparatus would be required to handle 42 pounds of charcoal per minute under such conditions. The tower would be about 40 feet high and 36 inches in diameter. The pneumatic conveyor would have a tubing diameter of 10 inches and its overall length be a little less than 60 feet. The centrifugal blower would supply an air flow of 2500 c.f.m. with a pressure sufficient to make the cyclone separator operate properly. Although the drawing diagrammatically shows a single cyclone separator, the unit might be a two stage device to obtain a high degree of separating efficiency. Five baffle plates would be used in the tower each separated 6 feet from an adjacent one. The plane of the baffle plates would be tilted downward from the horizontal by 40°. A nine-inch diameter screw conveyor with a 9-inch pitch would be used at the base of the tower. This screw would turn at 25 r.p.m. Its motor drive would be electrically interlocked with the motor driving the centrifugal blower. A safety device would be employed on the intake of the pneumatic conveyor so that should the charcoal entering the conveyor exceed a certain temperature, say 200° F., the conveyor would shut down, sound a warning, and perhaps shut down the producing retort. This feature is desirable because if granular charcoal is above a certain temperature, say in excess of 300° F., it will burst in flame when suddenly thrust into the air.

While a specific example of the practice of the invention has been described, it will be obvious that many changes may be made therein without departing from the scope of this invention.

What I claim and desire to obtain by Letters Patent of the United States is:

The method of treating hot freshly produced particles of charcoal to obviate spontaneous combustion, which comprises introducing the particles into a carrier stream of cool air, passing the particles and cool air through a tubular conduit until the air has absorbed a substantial amount of heat from the particles, separating the now-heated air from the particles, introducing the partially cooled particles into a vertical tower, permitting the particles to drop through the tower, tumbling the falling particles a plurality of times during their fall, admitting air adjacent the bottom of the tower as a countercurrent stream, and regulating the admission of the latter air to limit the velocity of the countercurrent stream.

References Cited in the file of this patent

UNITED STATES PATENTS

| | | |
|---|---|---|
| 271,604 | Cook | Feb. 6, 1883 |
| 789,807 | Holl | May 16, 1905 |
| 2,048,112 | Gahl | July 21, 1936 |
| 2,199,945 | Archer et al. | May 7, 1940 |
| 2,363,282 | Arnold | Nov. 21, 1944 |
| 2,392,764 | Reeves | Jan. 8, 1946 |
| 2,607,199 | Christensen | Aug. 19, 1952 |
| 2,634,808 | Arnold | Apr. 14, 1953 |
| 2,770,543 | Arnold et al. | Nov. 13, 1956 |
| 3,002,289 | Nielsen | Oct. 3, 1961 |